United States Patent [19]
Bell et al.

[11] Patent Number: 5,923,854
[45] Date of Patent: Jul. 13, 1999

[54] VIRTUAL INTERNET PROTOCOL (IP) ADDRESSING

[75] Inventors: Jon Anthony Bell, Raleigh; Edward Glen Britton, Chapel Hill, both of N.C.

[73] Assignee: International Business Machines Corporation, Armonk, N.Y.

[21] Appl. No.: 08/755,420

[22] Filed: Nov. 22, 1996

[51] Int. Cl.⁶ .............................. G06F 13/38; G06F 15/17
[52] U.S. Cl. ................................ 395/200.73; 395/200.75; 370/409
[58] Field of Search .............................. 395/500, 200.01, 395/200.76, 200.5, 200.51, 200.75, 200.8, 200.73; 370/397, 399, 409

[56] References Cited

U.S. PATENT DOCUMENTS

| | | | |
|---|---|---|---|
| 5,261,052 | 11/1993 | Shimamoto et al. | 395/200.75 |
| 5,434,974 | 7/1995 | Loucks et al. | 395/200.75 |
| 5,579,480 | 11/1996 | Cidon et al. | 395/200.73 |
| 5,802,320 | 9/1998 | Baehr et al. | 395/200.73 |

Primary Examiner—Mark H. Rinehart
Attorney, Agent, or Firm—Jeanine S. Ray-Yarletts

[57] ABSTRACT

In a telecommunications system containing a host computer and multiple real connections to the telecommunications network, an apparatus, method and system for allowing transmission to the host computer to reroute dynamically through the multiple available real connections to the host without requiring changes to the devices connecting to the host.

18 Claims, 5 Drawing Sheets

VIRTUAL INTERNET PROTOCOL (IP) ADDRESSING

BACKGROUND OF THE INVENTION

TCP/IP (Transmission Control Protocol/Internet Protocol) is the transport mechanism underlying the Internet. It is also the underlying protocol for many intranets and business applications in existence today. TCP/IP was started as an educational and scientific network. It was not designed to handle high-volume traffic with the requirement of availability 7 days per week, 24 hours per day. TCP/IP was designed primarily as a fast transport mechanism. Because of this design point, there were few backup or redundancy measures incorporated into TCP/IP.

Through the growth of the Internet, which includes the world wide web, requirements have arisen for higher availability and greater reliability for host TCP/IP networks. This has become especially true where the TCP/IP host controls business applications or transactions. The design of TCP/IP is such that each physical network interface adapter has associated with it an address. This address is unique within the entire network and is the method by which all other devices communicate with the adapter or the devices connected through the adapter. If a given TCP/IP host has multiple interface adapters, the users communicating with the host must select an interface adapter which they chose to use. The user must then reference the host by the address of the particular adapter which the user has chosen to use.

The above method works well when each host has one interface adapter or where the interface adapters never fail, but in large host systems where there are more than one interface adapter available, situations arise where one of the interface adapters fails. When this happens, under the current TCP/IP implementations, the information that is being sent to the failing interface adapter is incapable of being rerouted to the functioning interface adapter(s). The only method available to rectify the break in the communications link is to either replace the failing adapter and configure the new adapter with the same network address as the adapter that failed or to modify the application sending information to send information to the new network adapter, or to detect the failure, determine which resources are affected and broadcast the new location upon which the affected resources can be found. All of these potential solutions require the intervention of an operator or an applications programmer which will result in the loss of packets and the disruption of traffic.

SUMMARY OF THE INVENTION

The present invention allows for a dynamic rerouting of traffic from one network device to another available network device or adapter on the same host without the loss of packets or the intervention of an operator. This invention enhances the fault tolerance of a TCP/IP network using hosts with multiple or redundant devices or network interface adapters without significantly increasing the cost of the network. This is accomplished by the use of a virtual device, a virtual adapter and a virtual IP address (VIPA). The virtual device will be active as long as the host upon which it resides is active. The virtual adapter will have a home address of the virtual IP address, but there will be no physical interface directly associated with it. This allows traffic with the address of the virtual IP address to be routed through any of the available physical network interface devices that are running in the host utilizing traditional routing protocols such as Route Information Protocol (RIP).

In addition, broadcast or advertising techniques can be used to ensure that all the routers, hosts or other devices adjacent to the host which contains the virtual IP address are made aware of this virtual IP address such that they can use a highly available, highly reliable network interface address.

DETAILED DESCRIPTION OF THE PREFERRED EMBODIMENT

The preferred embodiment of the present invention is implemented in, but not limited to, an IBM MVS host running the TCP/IP protocol. It allows for an IP address that selects a TCP/IP stack (and an MVS image if there is only one stack on the MVS image) without selecting a specific network device or attachment. Other hosts that connect to MVS TCP/IP applications can send data to the MVS virtual IP address via whatever paths are selected by the routing protocols. This provides additional tolerance of failures for devices and adapters attached to an MVS host.

The means of accomplishing this task is to modify the configuration file of the host's TCP/IP software such that a single network interface device address is assigned to a host, this single address being a virtual address. This virtual address is then used as the address for notifying or indicating to other nodes where the particular host is located. In addition, the virtual IP address is used as the outgoing source address in the messages sent from the host to other nodes, hence the virtual IP address is the only interface address known for the system in the preferred embodiment. This allows real, physical adapters to fail, be added or be removed without affecting the flow of messages.

This flexibility is achieved by modifying the IP protocol software to treat such virtual devices and addresses differently from physical devices. In particular, the software is modified to treat virtual devices as always being operational. Furthermore, the IP protocol software is modified to always use the virtual IP address for normal data traffic as the source IP address field of datagrams being sent out to the network. The IP software is also modified so that no start commands are necessary for virtual devices in the configuration file. Moreover, the routing software, also known as the RIP software or Route Information Protocol software, is modified so that it need not receive RIP updates for the virtual routes. This reduces the amount of status traffic and allows the virtual interface and the virtual routes associated with it to remain "active" until an operator expressly deletes them. This is more fully described with reference to the figures.

Figure 1:
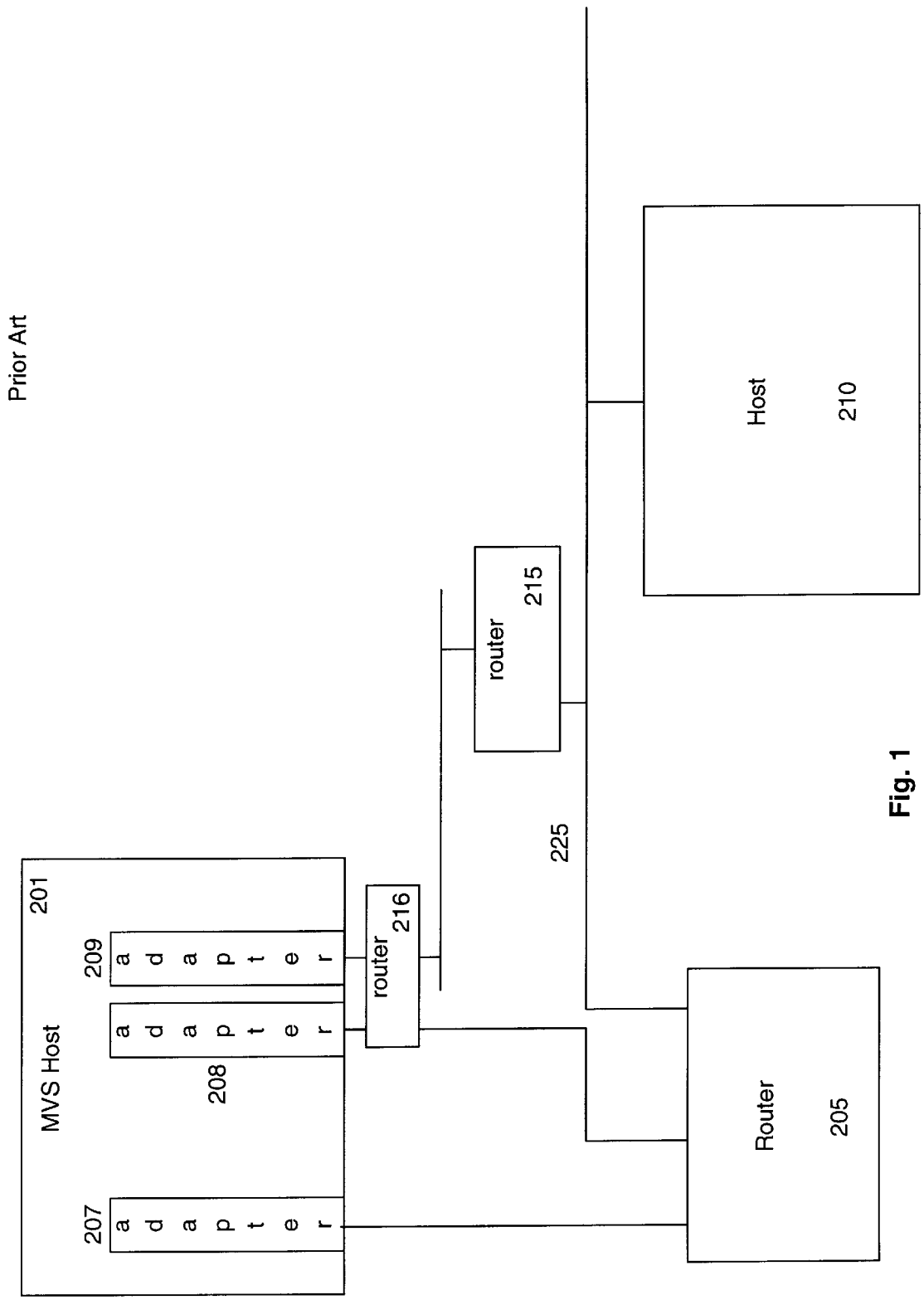
FIG. 1 depicts a portion of the prior art TCP/IP network.

FIG. 1 depicts the prior art connection of a subset of a TCP/IP network. The portion of the network shown in FIG. 1 contains two hosts, the MVS host 201 and the user's host 210. The MVS host 201 is connected to the TCP/IP network 225 by means of three different adapters. The first adapter, 207, connects directly to the a router 205, through which it connects to the TCP/IP network 225. The second adapter 208 and the third adapter 209 connect to router 216, which then connects through router 205 to the TCP/IP network and through router 215 into the TCP/IP network. This is intended to display only a small subset of the available possibilities for connection into a TCP/IP network, it is not meant to limit the use of the invention in any way to subsets of the TCP/IP network. Without the present invention, if the host 210 recognized the MVS host 201 as being at adapter 207, and adapter 207 failed, then all communications between the MVS host 201 and the host 210 would stop.

Figure 2:
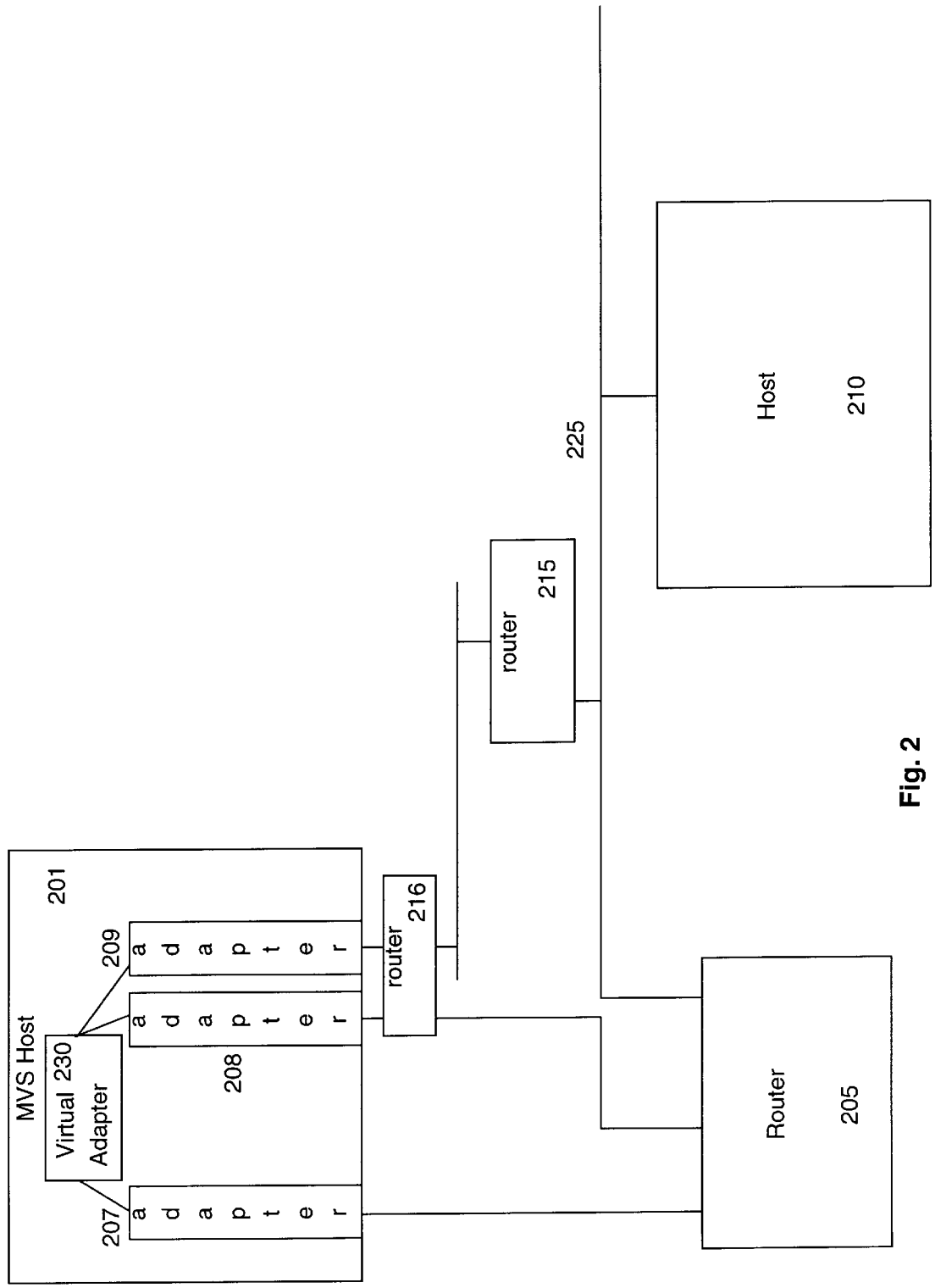
FIG. 2 depicts a portion of a TCP/IP network including the present invention.

FIG. 2 depicts a portion of a TCP/IP network in which the present invention is implemented. In the network of the present invention, a virtual adapter 230 is defined in the MVS host 201. The virtual adapter is defined to reference each of the real adapters available in the host (207, 208 & 209) such that any other host sending messages to the MVS host need only reference the virtual adapter address and the messages will be send to the MVS host. This allows one or more of the adapters to fail or become unavailable without impacting the flow of traffic. This is achieved by advertising only the virtual route that represents the virtual IP address and allowing the normal routing protocols to route the information on the shortest available path. Continuing with the example from above, if adapter 207 fails, utilizing the present invention, the router 205 continues sending to the virtual adapter 230. When adapter 207 fails, the traffic is automatically rerouted through the network to adapter 208. If adapter 207, at a later time, becomes available then the traffic can be dynamically rerouted through adapter 207 since, at that time, the path through adapter 207 will be the shortest available path to the target virtual address.

Figure 3A:
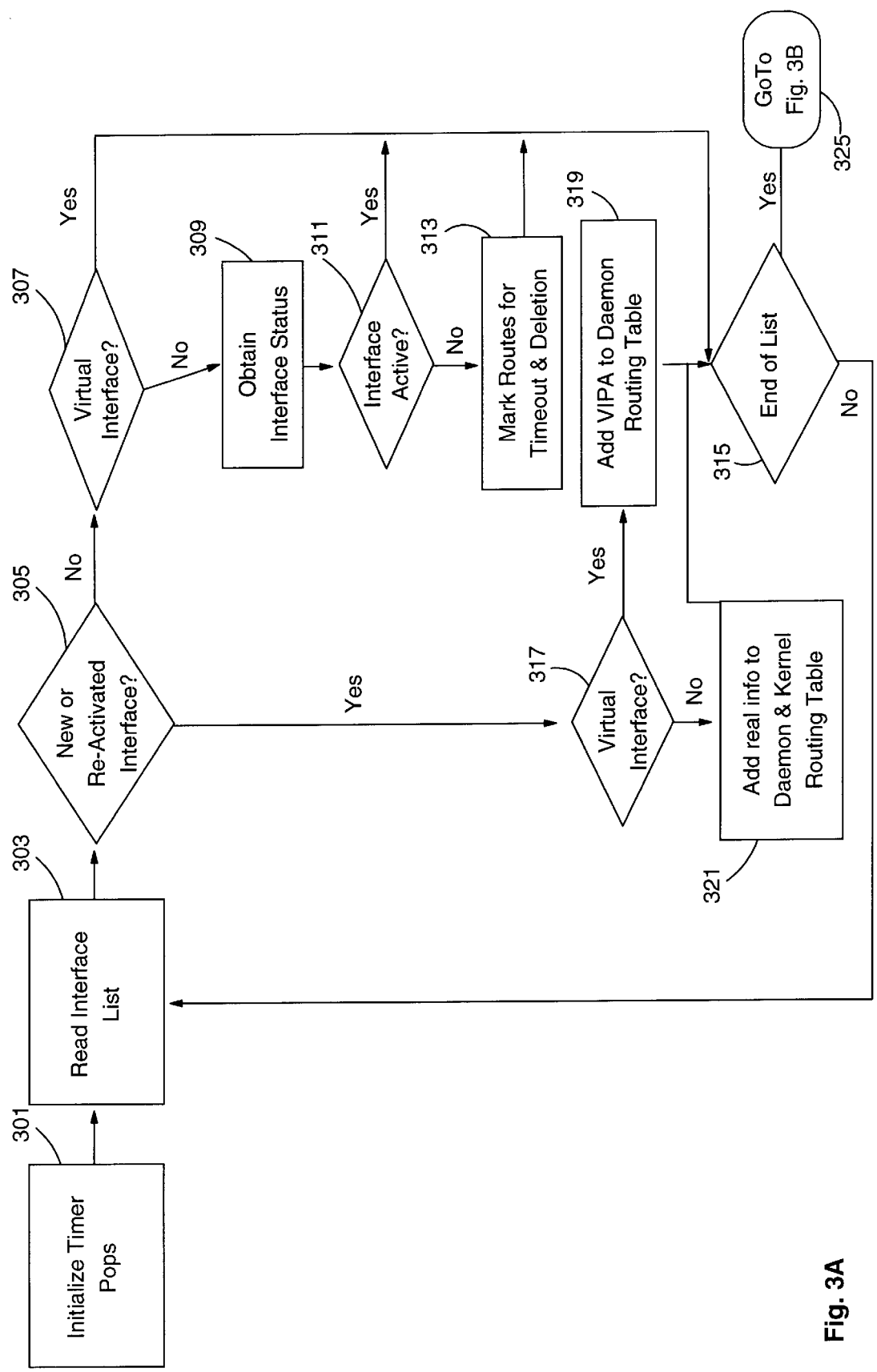
FIGS. 3A and 3B depicts the logic of notifying the network of the virtual IP address.
Figure 3B:
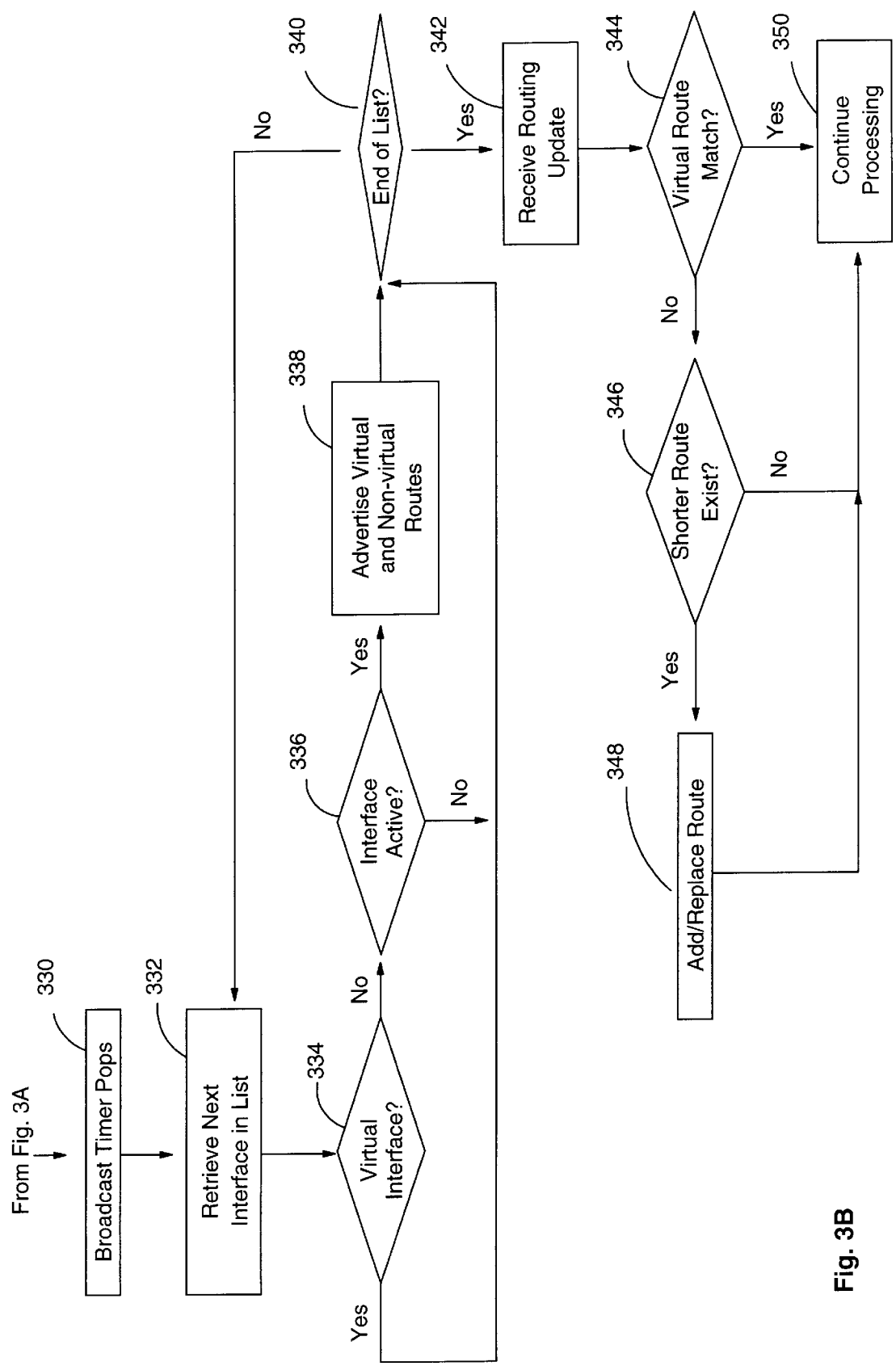
Figure 4:
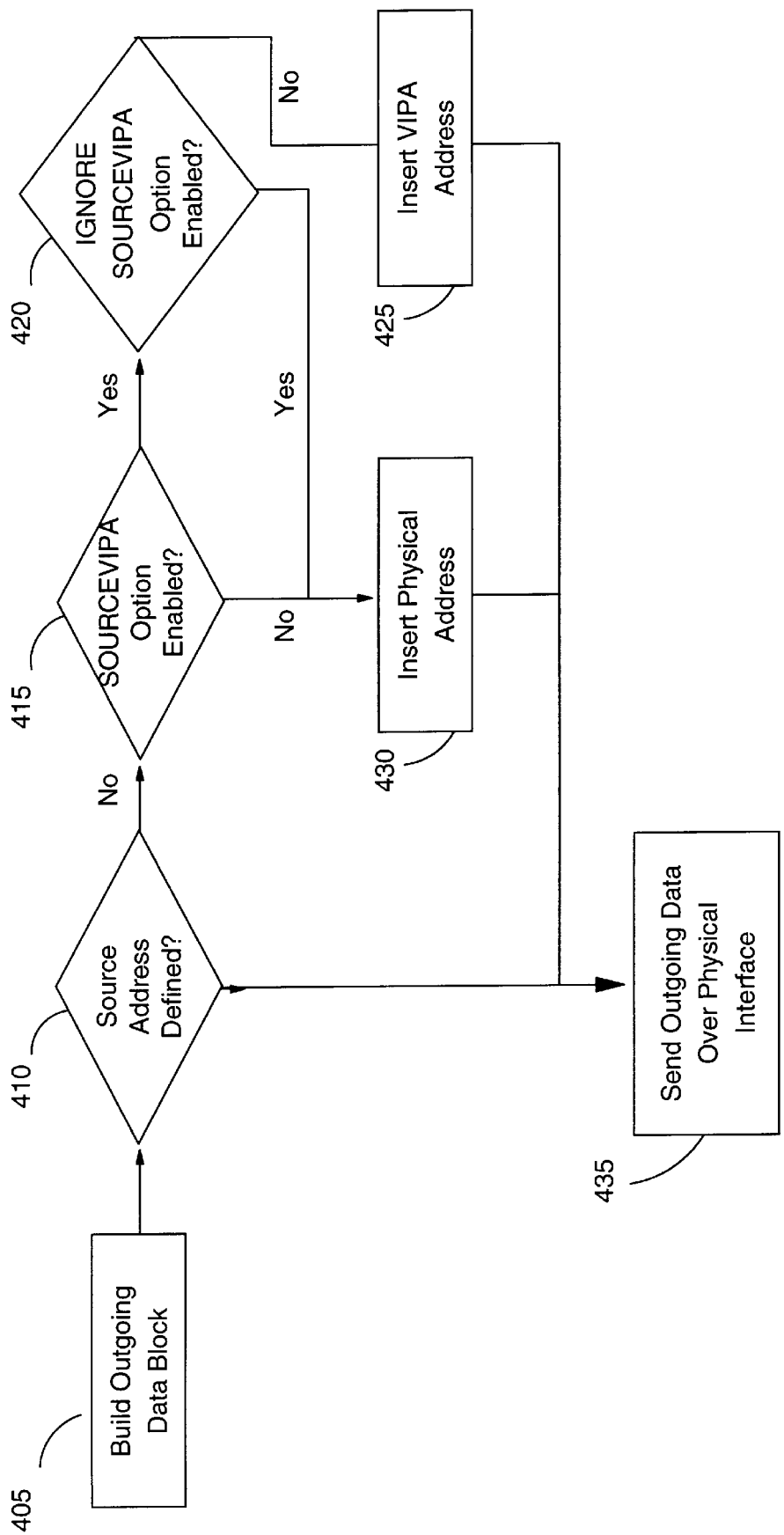
FIG. 4 depicts the decision necessary for inserting a source address in the outgoing packet.

FIGS. 3 and 4 demonstrate the flow of information in the MVS host which permit this to happen. First, the virtual device and virtual link are defined by an operator. In the preferred embodiment this is done using the DEVICE and LINK statements in the network definition file. Once this happens the virtual routes representing the virtual IP address used to identify the host will be sent to all of the attached hosts and routers advertising the location of the MVS host. Once this is announced, if all packets targeted for the MVS host are assigned the virtual IP address as their target address, then the routing protocol will direct the packets to each of the virtual IP addresses via any of the active real adapters connected to the MVS host 201.

In addition to the advertising of the routes to the virtual IP address, the internet protocol software of the MVS machine is modified to insert the virtual IP address into the source IP address field of messages which it transmits to other hosts. This ensures that the virtual IP address is the one that is used by other parties to the communication. The only exception to this is that the virtual address is not used in transmission of the RIP routing packets. The actual physical adapter address is used for the RIP routing packets as required by the routing protocol.

FIG. 4 depicts the changes to the logical flow of creating the outgoing data block. As construction of the outgoing data block begins (405) a test is done to determine if the the source address has already been defined (410). This will be true when the data block came from another source outside the local host. If the source address is not yet defined a test is done to determine whether source virtual IP addressing is enabled (415). This is done by testing the option named SOURCEVIPA. If SOURCEVIPA is enabled, then a test is made to determine whether or not SOURCEVIPA should be ignored (420). This would be the case when RouteD was being used for RIP packets. In general, the IGNORE SOURCEVIPA option is not set for TCP, UDP (except in the case of RIP) and ICMP datagrams. If the IGNORE SOURCEVIPA is enabled, then the physical address is inserted into the outgoing data block (435). If the IGNORE SOURCEVIPA is not enabled, the virtual IP address is inserted into the outgoing data block (425).

Returning to block 415, if the source address was not defined (410) and the SOURCEVIPA option was not enabled, then the physical address is inserted into the outgoing data block (435). All cases then return to a common logic flow and send the outgoing data block over the physical interface (430).

FIG. 3 depicts the changes to the logical flow of processing the expiration of the broadcast timer in the MVS host of the preferred embodiment. Beginning with FIG. 3A, in the preferred embodiment, the first step of the logic is to initialize or scan when the interface timer pops (301). Next the list of interfaces is read into memory (303). A test is made to determine whether the interface is new or has been reactivated (305). If the interface is not new or reactivated, then a test is made to determine if the interface is a virtual interface (307). If the interface is not a virtual interface, the status of the interface is obtained (309) and a test is made to determine whether this real interface is active (311). If the interface is a real interface and it is not active the routes for the interface are marked for timeout and deletion (313). A test is then made to determine whether the entire list of interfaces has been processed (315).

At the test to determine whether the interface was a virtual interface (307), had the interface been a virtual one, the logic flow would have gone directly to the test for the end of list (315) since virtual interfaces are never inactivated by timeouts in the preferred embodiment. If, when a test was made as to whether the interface were new or reactivated (305), it was determined that the device were new or reactivated, a test would then be made to determine whether the interface were a virtual interface (317). If it were a virtual interface, the virtual IP address net, subnetwork and host routes would be added to the daemon routing table (319). If it were determined that the new or reactivated interface were not a virtual interface (317), then the real net subnetwork and host routes for the interface would be added to the routing table (321). At this point all of the logic flows converge on a test to determine whether the end of the interface list has been reached (315). If the end of the list has not been reached, then flow returns to block 303 to continue reading the list. If the end of the list has been reached, the logic flow continues on to FIG. 3B.

FIG. 3B begins with the timer popping or expiring (330) which causes the application to loop through the interfaces in the interface list (332). A test is made to determine whether that next interface is a virtual interface (334). If it is a virtual interface, a test is made to determine whether the end of the interface list has been reached (340), if the end of the this has not been reached then the pointer to the next interface is incremented (332). If the next retrieved interface is not a virtual interface (334) then a test is made to determine if the interface is active (336). If the real interface is not active, a test is made to determine whether the end of the list has been reached (340) and if the end of the interface list has not been reached then the logic flow returns to retrieving the next item in the interface list (332). If the real interface is active (336), then virtual and non-virtual routes are advertised using the daemon routing table. These are sent over the physical interfaces. At this point a test is made to determine whether the end of the interface list has been reached (340). If the end of the interface list has not been reached, control returns to 332.

If at any point it was determined that the end of the interface list had been reached (340), the process would then receive the routing updates (342) and make a test to determine whether there was a virtual route match (344). If there is a virtual route match, the process would continue (350). If it were determined that there was not a virtual route match, a test is made to determine if a route exists that is shorter (346) based on whatever metric is chosen for the system. If it were determined that a shorter route does exist, then the route is replaced (348) by the shorter route. In either case, the process continues on its normal flow.

What is claimed is:

1. A host computer connected to a communications network, said host containing two or more network interface adapters, each of said network interface adapters having a unique physical address assigned, said network interface adapters connecting said host computer to said communications network wherein information may be dynamically rerouted through any of said two or more network interface adapters onto said communications network, said dynamic rerouting comprising the steps of:

creating a virtual IP interface adapter for said host wherein said virtual IP interface adapter is recognized as being continuously operational;

allocating a virtual IP address for said virtual IP interface adapter; and, replacing each of said physical addresses of said network interface adapter with said virtual IP address in all routing advertisements utilizing existing routing protocols to dynamically reroute said information.

2. A host computer as claimed in claim 1 wherein each of said physical addresses is replaced with said virtual IP address in outgoing data blocks.

3. A host computer as claimed in either of claims 1 or 2 wherein the communications protocol being used is TCP.

4. A host computer as claimed in either of claims 1 or 2 wherein the communications protocol being used is Internet Control Message Protocol (ICMP).

5. A host computer as claimed in either of claims 1 or 2 wherein the communications protocol being used is User Datagram Protocol (UDP) but not Routing Information Protocol (RIP).

6. A host computer as claimed in either of claims 1 or 2 wherein two or more virtual IP addresses are assigned to said host.

7. A method for connecting host computer to a communications network, said host containing two or more network interface adapters, each of said network interface adapters having a unique physical address assigned, said network interface adapters connecting said host computer to said communications network wherein information may be dynamically rerouted through any of said two or more network interface adapters onto said communications network, said dynamic rerouting comprising:

means for creating a virtual IP interface adapter for said host;

means for allocating a virtual IP address for said virtual IP interface adapter wherein said virtual IP interface adapters are recognized as being continuously operational; and, means for replacing each of said physical addresses of said network interface adapter with said virtual IP address in all routing advertisements utilizing existing routing protocols to dynamically reroute said information.

8. A method as claimed in claim 7 wherein each of said physical addresses is replaced with said virtual IP address in outgoing data blocks.

9. A method as claimed in either of claims 7 or 8 wherein the communications protocol being used is TCP.

10. A method as claimed in either of claims 7 or 8 wherein the communications protocol being used is Internet Control Message Protocol (ICMP).

11. A method as claimed in either of claims 7 or 8 wherein the communications protocol being used is User Datagram Protocol (UDP) and not Routing Information Protocol (RIP).

12. A method as claimed in either of claims 7 or 8 wherein two or more virtual IP addresses are assigned to said host.

13. A media containing programmable code for execution on a host computer connected to a communications network, said host containing two or more network interface adapters, each of said network interface adapters having a unique physical address assigned, said network interface adapters connecting said host computer to said communications network wherein information may be dynamically rerouted through any of said two or more network interface adapters onto said communications network, said dynamic rerouting comprising the steps of:

programmable means for creating a virtual IP interface adapter for said host;

programmable means for allocating a virtual IP address for said virtual IP interface adapter wherein said virtual IP interface adapters are recognized as being continuously operational; and, programmable means for replacing each of said physical addresses of said network interface adapter with said virtual IP address in all routing advertisements utilizing existing routing protocols to dynamically reroute said information.

14. A media containing programmable code as claimed in claim 13 wherein each of said physical addresses is programmably replaced with said virtual IP address in outgoing data blocks.

15. A media containing programmable code as claimed in either of claims 13 or 14 wherein the communications protocol being used is TCP.

16. A media containing programmable code as claimed in either of claims 13 or 14 wherein the communications protocol being used is Internet Control Message Protocol (ICMP).

17. A media containing programmable code as claimed in either of claims 13 or 14 wherein the communications protocol being used is User Datagram Protocol (UDP) and not Routing Information Protocol (RIP).

18. A media containing programmable code as claimed in either of claims 13 or 14 wherein two or more virtual IP addresses are assigned to said host.

* * * * *